(12) United States Patent
Cavalheiro

(10) Patent No.: US 6,487,747 B2
(45) Date of Patent: Dec. 3, 2002

(54) CURVED HANDLE FOR LONG HANDLED TOOLS

(75) Inventor: Flabio Cavalheiro, Nyack, NY (US)

(73) Assignee: Kaminstein Imports, Inc., Blauvelt, NY (US)

( * ) Notice: Subject to any disclaimer, the term of this patent is extended or adjusted under 35 U.S.C. 154(b) by 23 days.

(21) Appl. No.: 09/757,548

(22) Filed: Jan. 10, 2001

(65) Prior Publication Data

US 2002/0088092 A1 Jul. 11, 2002

(51) Int. Cl.[7] .................................................. B25G 1/10
(52) U.S. Cl. ...................... 15/143.1; 16/110.1
(58) Field of Search .............................. 15/143.1, 159.1, 15/229.2, 229.6; 16/110.1, 421, 430, 436; D4/138; D32/50, 51

(56) References Cited

U.S. PATENT DOCUMENTS

| 501,383 | A | | 7/1893 | Thomas |
|---|---|---|---|---|
| 603,694 | A | | 5/1898 | Kavanaugh |
| 634,637 | A | | 10/1899 | Allen |
| 645,988 | A | | 3/1900 | Willard |
| 1,315,194 | A | | 9/1919 | Yamamoto |
| 1,505,318 | A | | 8/1924 | Berlow |
| 1,609,906 | A | | 12/1926 | Buckley |
| 1,674,983 | A | | 6/1928 | Morton |
| 1,982,910 | A | | 12/1934 | Forbes et al. |
| 2,818,291 | A | | 12/1957 | Corns |
| 3,045,269 | A | | 7/1962 | Coffman et al. |
| D247,212 | S | * | 2/1978 | Welch |
| 4,704,758 | A | | 11/1987 | Hoffman |
| 4,785,489 | A | | 11/1988 | Von Doehren |
| 4,809,388 | A | * | 3/1989 | Dietrich |
| D359,605 | S | | 6/1995 | Janikowski |
| 5,528,792 | A | * | 6/1996 | Nazemi |
| 5,706,553 | A | | 1/1998 | Riley et al. |
| 5,720,071 | A | * | 2/1998 | Hall |
| 5,791,006 | A | | 8/1998 | Anctil |
| 5,920,944 | A | | 7/1999 | Biggs et al. |
| 6,170,112 | B1 | * | 1/2001 | Mayfield et al. |

* cited by examiner

Primary Examiner—Terrence R. Till
(74) Attorney, Agent, or Firm—Stephen E. Feldman

(57) ABSTRACT

An elongated handle for a broom or mop having an offset portion defined by two wide radius curves of specified differing radii which blend smoothly into each other near the attachment point for the broom or mop.

12 Claims, 2 Drawing Sheets

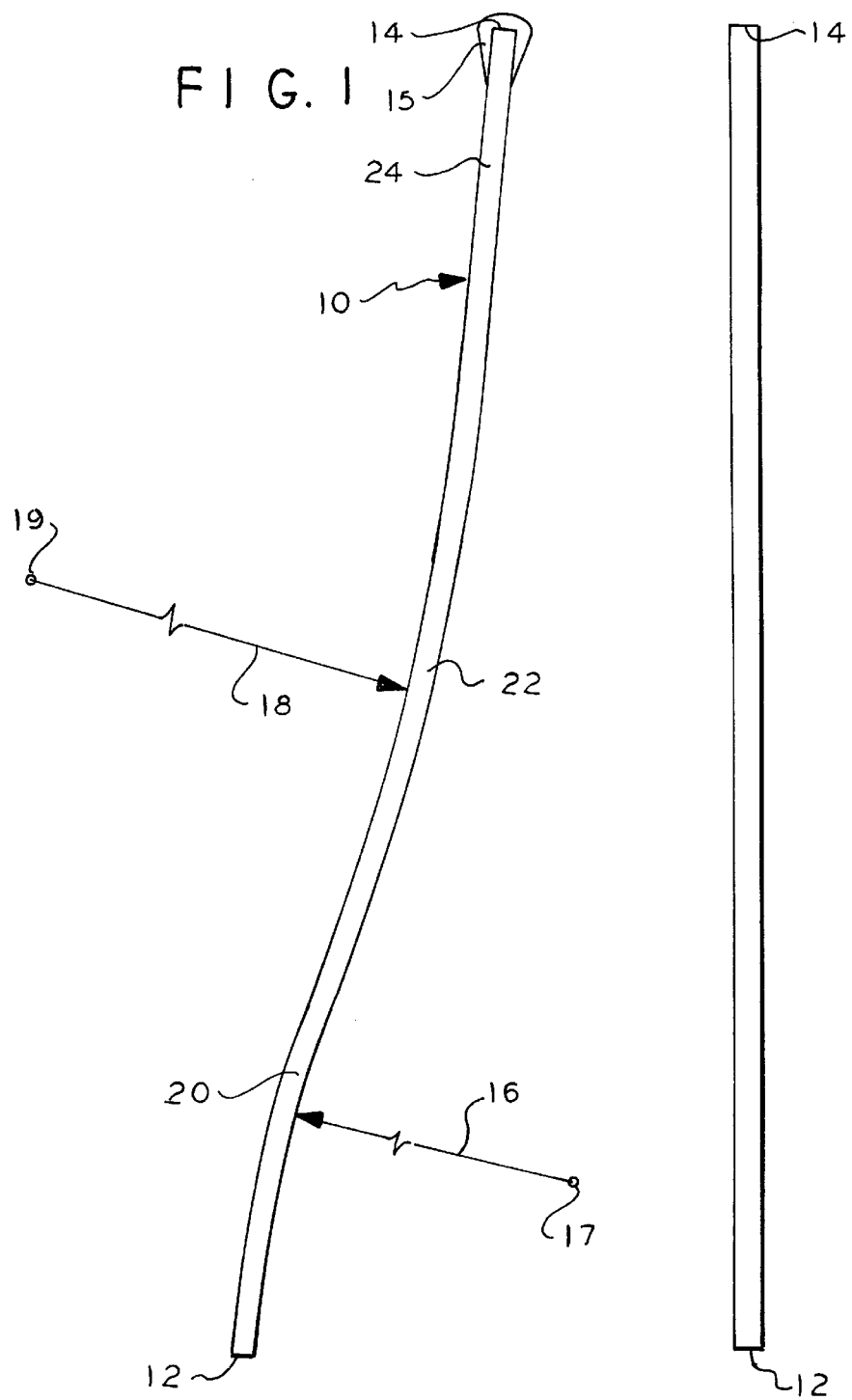

CURVED HANDLE FOR LONG HANDLED TOOLS

RELATED APPLICATION

The entire disclosure of assignee's co-pending relating U.S. patent application titled "Broom Base with a Handle Opening in the Head Thereof" (Ser. No. 09/757757) filed on Jan. 10, 2001 is hereby incorporated by reference.

BACKGROUND OF THE INVENTION

1. Field of the Invention

The present invention relates to handles for long handled tools such as shovels, rakes, brooms, and mops. More particularly it relates to handles of mops and broomsticks, especially a broomstick for a broom, which is adapted to reach into confined spaces such as the corner of a room.

2. Description of the Prior Art

There are numerous patents, some issued more than 100 years ago, which seek to provide an improved handle for a broom or mop. U.S. Pat. No. 603,694 to Kavanaugh discloses a broom having a convention rigid handle, which is secured to a broom head by means of a spring-loaded pivot joint built into the top of the broom head.

There are also patents, which disclose a broom or mop with a rigid handle having one or more sharp bends to accomplish a pair of offsets to enable the user to reach under obstacles. U.S. Pat. No. 1,315,194 to Yamamoto utilizes a pair of sharp bends in the lower portion of a broom handle while U.S. Pat. No. 4,704,758 to Hoffman has two 90 degree bends and one 45 degree bend in the upper portion of the handle and the length of the handle is telescopically atable.

Another approach is to introduce a coil spring to permit the handle to bend or yield in use. U.S. Pat. No. 4,785,489 to Van Doehren has a coil spring on the lower end of the handle and a yieldable bracket between the spring and the broom head. U.S. Pat. No. 1,674,983 to Morton utilizes handle with a hollow portion near the broom head and a coil spring within the hollow portion. U.S. Pat. No. 634,637 to Allan features a coil spring surrounding a reduced diameter portion of the handle near the broom head.

Another school of though is to make the handle material itself more flexible in selected areas. U.S. Pat. No. 645,988 to Willard teaches a corrugated saw kerf or slit extending across the diameter of a broomstick. U.S. Pat. No. 501,383 to Thomas uses a longer saw kerf so that the handle can be gradually bent over a major portion of its length but will yield in use.

Unlike the prior art broom or mop handle discussed above in the present invention the handle is rigid and permanently curved over a portion of its length without making it yieldable or further bendable in use. It is appreciated that the term "rigid" is a relative measurement, nothing is absolutely rigid or perfectly stiff so "rigid" as used herein refers to non-bending in ordinary use.

The present invention is the result of careful study to determine the degree of bend and offset, which is desirable in a broomstick, or mop handle and the location of such bends along the length of the broomstick or handle.

It is therefore an object of the present invention to provide a broomstick or mop handle having an offset portion of a degree and lengthwise location so that a broom can be used most effectively, especially when reaching into relatively inaccessible locations.

It is a well known problem that most brooms are tiring to use and over long periods are particularly frustrating to use in cleaning confined spaces such as room comers. A principal object of the invention is to supply a broom handle which, when attached to a broom head, makes it easier to reach into confined spaces. Further objects and advantages will become apparent upon review of the present description and drawings.

BRIEF DESCRIPTION OF THE DRAWINGS

Although a preferred embodiment is illustrated, modifications and variations are possible in light of the present teachings. It is to be understood that within the scope of the appending claims the invention may be practiced other than as specifically described herein. Referring now to the drawings, FIG. 1 is a side elevation of the curved handle for long handled tools of the present invention;

FIG. 2 is a front view of the handle shown in FIG. 1; and

DETAILED DESCRIPTION OF THE INVENTION

Figure 3:
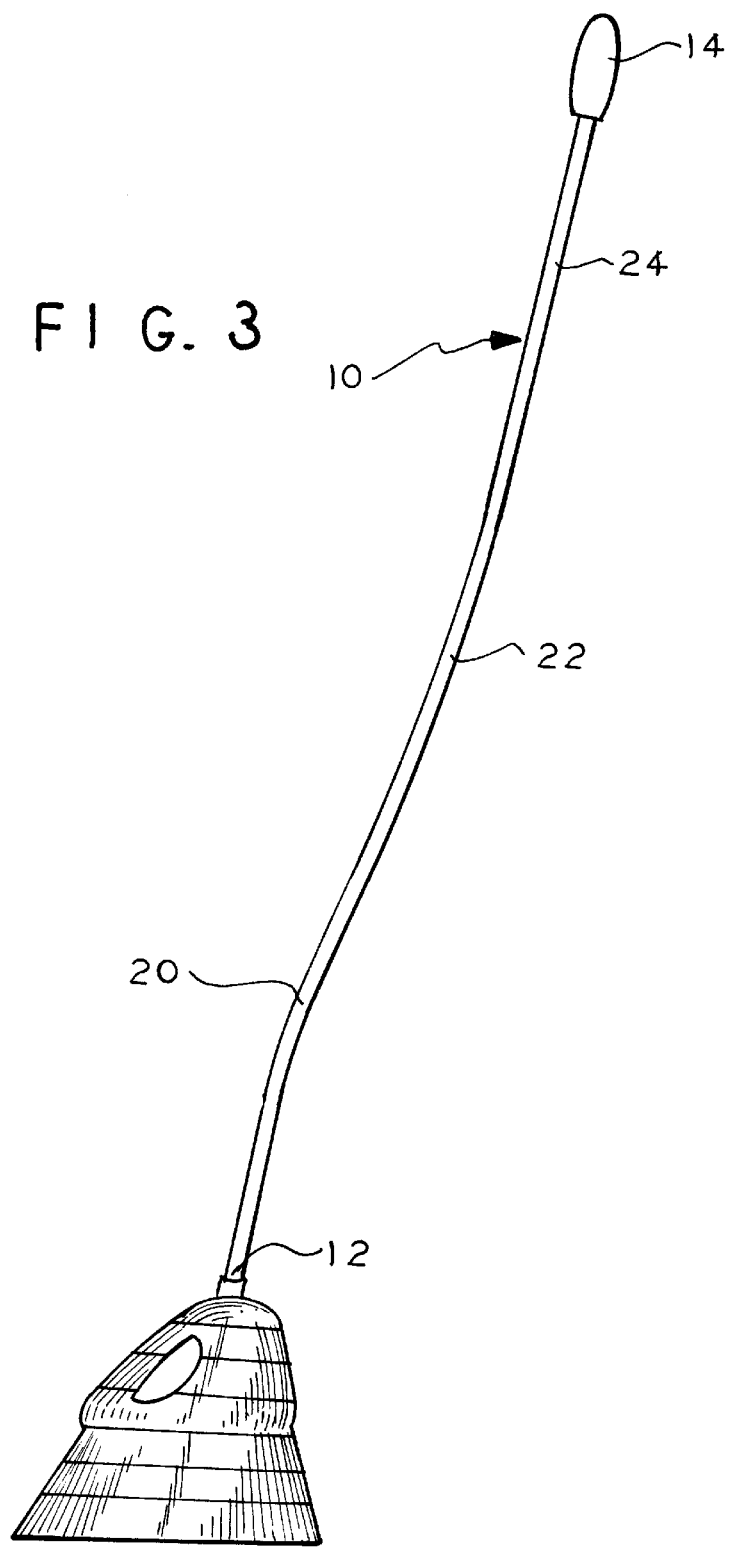
FIG. 3 shows the handle attached to a broom head.

The handle of the present invention has an elongated body 10 which may be made of wood or plastic but is preferably a hollow metal tube which can be bent and will thereafter be rigid and hold its bent shape. The body 10 has a lower first end 12 for attachment to a broom or mop and would usually have some attachment means such as threaded fitting, a bayonet fitting or a through pin hole.

Above end 12 is first curved portion 20, the curved portion being on a radius 16 swung from first pivot point 17. First curved portion 20 blends smoothly into second curved portion 22, which is defined by a radius 18, which is swung from a second pivot point 19.

The first radius 16 is preferably in the range of 800 to 1200 millimeters (mm) and more preferably 1000 to 1200 nm (actually 1022 mm). The second radius 18 is preferably in the range of 1800 to 2300 mm and more preferably 1900 to 2200 mm (actually 2102 mm).

The second curved portion 22 blends smoothly into straight upper portion 24 terminating in a second end 14. That end is preferably finished with an end fitting 15 made of resilient rubber or plastic material to facilitate easy gripping by the user.

The overall length of the body 10 is about 1200 mm. That length could of course vary depending on the type broom mop head with which the handle is used.

It should be understood that the drawings are not to scale and thus the pivot points 17 and 19 and the length of radius lines 16 and 19 would actually extend off the paper if properly drawn to scale.

The actual location of pivot points 17 and 18 in a body 10 with a length of 1200 mm may be determined by constructing a horizontal line at upper handle end 14. The pivot point 19 may be located by a measurement along that horizontal line which is about 2100 mm to the left of handle 10 and about 1130 mm vertically below the 2100 mm measurement.

The pivot point 17 may be located by a measurement along that horizontal line which is about 800 mm to the right of handle 10 and about 1190 mm vertically below the 800 mm measurement. In such a handle the straight portion 24 is about 310 mm long.

The measurements are given solely for the sake of complete disclosure and not by way of limitation so as to teach the presently preferred embodiment. The inventor is entitled to a range of equivalents commensurate with the state of the prior art.

What is claimed is:

1. A handle for a broom or mop comprising:

An elongated body of generally circular cross section having a first end for

Attachment to a mop or broom and a second free end;

said body in side view having a shape including an upper portion near said second free end and a lower portion having first and second curves, said curves being positioned adjacent each other and acting to form an offset in the handle;

said first curve being closest to said first end and being of a radius between 800 and 1200 mm with the center of the circle of said radius being on one side of said elongated body;

said second curve being spaced from said first end and being of a radius of 1800 to 2300 mm with the center of the circle of said second radius being on the opposite side of said elongated body with respect to said center of said first curve;

said elongated body in front view being a substantially straight line.

2. The handle of claim 1 in which the length of said handle between said first and second ends is about 1200 mm.

3. The handle of claim 1 in which said upper handle portion is substantially straight.

4. The handle of claim 1 wherein the elongated body is a hollow metal tube.

5. The handle of claim 1 wherein the elongated body is comprised of wood.

6. The handle of claim 5 wherein the attachment means is a bayonet fitting.

7. The handle of claim 5 wherein the attachment means is a threaded fitting.

8. The handle of claim 5 wherein the attachment means is a through pin hole.

9. The handle of claim 1 wherein the elongated body is comprised of a hollow tube.

10. The handle of claim 1 comprises a lower first end having means for attachment to a broom or mop.

11. The handle of claim 1 includes an end fitting of resilient material to facilitate easy gripping.

12. The handle of claim 1 wherein the elongated body is comprised of plastic.

* * * * *